US007581603B2

(12) United States Patent
Hammonds

(10) Patent No.: US 7,581,603 B2
(45) Date of Patent: Sep. 1, 2009

(54) OMNI-DIRECTIONAL AIRCRAFT AND ORDINANCE HANDLING VEHICLE

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 402 days.

(21) Appl. No.: 11/274,803

(22) Filed: Nov. 15, 2005

(65) Prior Publication Data

US 2009/0084635 A1 Apr. 2, 2009

Related U.S. Application Data

(60) Provisional application No. 60/628,415, filed on Nov. 15, 2004.

(51) Int. Cl.
*B62D 6/00* (2006.01)

(52) U.S. Cl. ...................................... 180/6.48; 414/546

(58) Field of Classification Search ................ 180/6.48, 180/6.5, 22, 24.02, 24.07, 907; 414/546, 414/496, 743, 744.3, 541
See application file for complete search history.

(56) References Cited

U.S. PATENT DOCUMENTS 655,329 A * 8/1900 Dougine .................... 180/6.24
813,213 A * 2/1906 Johnson ..................... 180/6.64
6,581,703 B2 6/2003 Hammonds
6,830,114 B2 12/2004 Hammonds
6,860,345 B2 3/2005 Hammonds

* cited by examiner

*Primary Examiner*—Kevin Hurley
(74) *Attorney, Agent, or Firm*—Gary L. Bush; Andrews Kurth LLP

(57) ABSTRACT

A powered omni-directional aircraft and ordinance handling vehicle which, in one embodiment, includes a circular frame and two drive wheels capable of independent powered forward and rearward rotation about a horizontal axis. The drive wheels are adapted to allow the vehicle to spin in place about a vertical axis which intersects the horizontal axis midway between the drive wheels and which is generally centered in the circular frame. A turret is rotatively mounted to the frame such that it is capable of rotation about the vertical axis, and an articulated ordinance handling arm is mounted to the turret. A castor is mounted to the frame for supporting the frame on the ground. A control system enables the vehicle to rotate in place to change headings while maintaining ordinance carried by the arm motionless with respect to the ground and to perform repetitive precise multi-axis motion control of the vehicle.

19 Claims, 8 Drawing Sheets

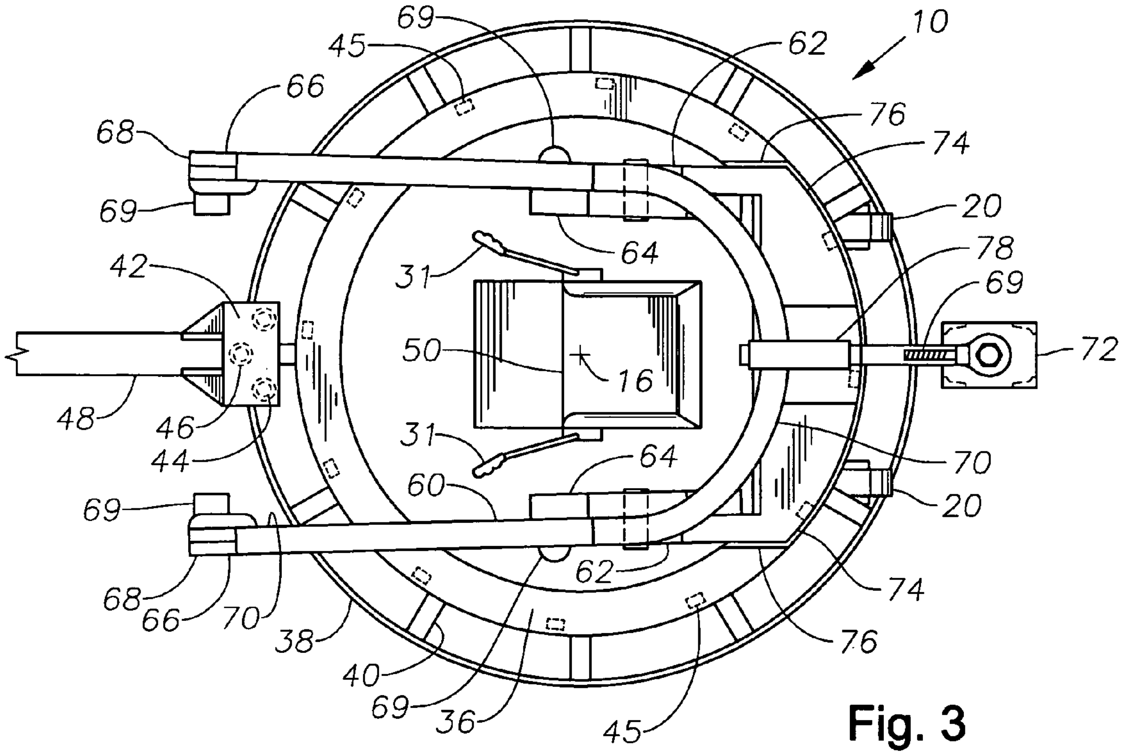
Fig. 3
Fig. 4
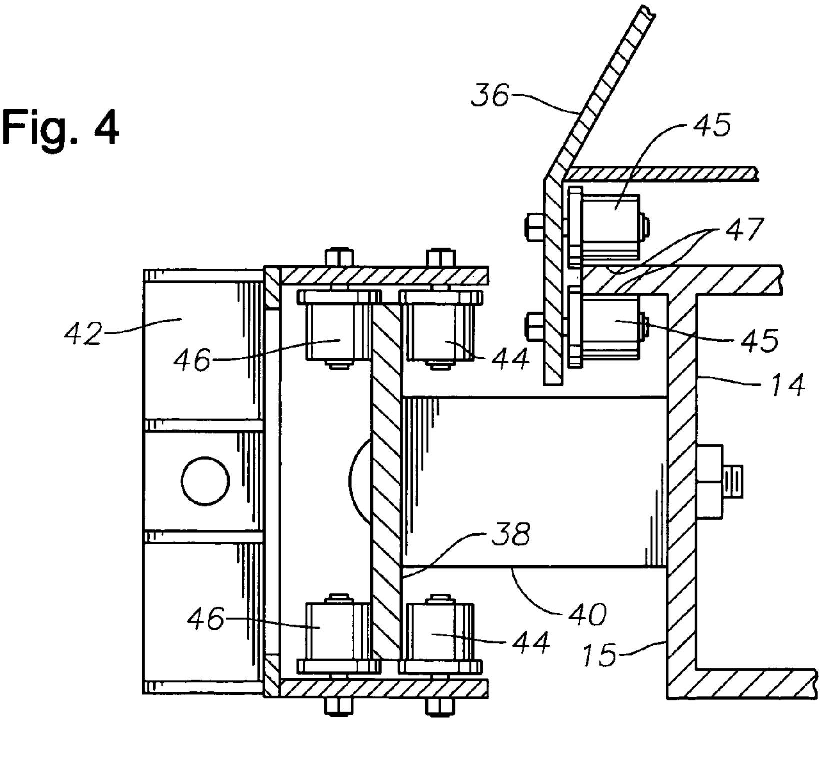

OMNI-DIRECTIONAL AIRCRAFT AND ORDINANCE HANDLING VEHICLE

CROSS REFERENCE TO RELATED APPLICATION

This application is based upon provisional application 60/628,415 filed on Nov. 15, 2004, the priority of which is claimed.

BACKGROUND OF THE INVENTION

1. Field of the Invention

This invention relates generally to a wheeled vehicle designed to turn about a vertical axis. In particular, the invention relates to powered utility riding vehicles of the type useful for military and naval aircraft servicing operations.

2. Description of the Prior Art

Conventional tow vehicles for aircraft, often called tractors, are typically configured with two axles, one in front, the other in the rear. The rear axle is fixed to the vehicle and provides motive force; two additional wheels are located at the front end of the vehicle, each being steerable and connected together to provide steering of the vehicle. Since there is a distance between the fixed rear drive wheels and the axis of the steerable wheels at the front end of the vehicle, a turning radius is required that far exceeds the space actually occupied by the vehicle itself. The longer the distance between the front and rear axles, the larger is the turning radius that is required to change direction of the vehicle. A large turning radius makes maneuvering around crowded airfields and naval vessels difficult and often dangerous. Operators are required to look over their shoulders in order to back up, and congestion is commonplace. A need exists for a service vehicle that requires less square footage for its footprint and less maneuvering space so that operator and aircraft safety are enhanced.

3. Identification of Objects of the Invention

A primary object of the invention is to provide a service vehicle that has enhanced maneuverability for towing or pushing aircraft and for handling munitions or ordinance, such as for securing missiles or bombs to the underside of military aircraft wings.

Another object of the invention is to provide a service vehicle that can turn on the spot and be of the smallest physical size relative to the space it occupies.

Another object of the invention is to provide a service vehicle which reduces the risk of accidents which result in damage or injury to equipment or operating personnel.

SUMMARY OF THE INVENTION

The features identified above, as well as other features of the invention are incorporated in a vehicle that, due to a combination of its characteristics including its shape and the configuration of its drive wheels, provides unique maneuverability and efficiency. When the vehicle is combined with a radial movable hitch to its circular frame, such combination provides for free circumferential attachment to and movement of other vehicles for transport of such vehicles with minimal space required for maneuverability and safety of operation. Such vehicles include tow bars adapted for moving aircraft.

The vehicle according to one embodiment of the invention has a frame with a perfectly round outer surface about its perimeter with no external appendages. That outer surface is characterized as a perfect, unobstructed smooth circle defined by a vertical axis of the vehicle. The vehicle has two independent drive wheels located on a horizontal axis which intersects the vertical axis. Each wheel is at exactly the same distance from the vertical axis, with each wheel having the capability to move independently and at infinitely variable speeds in either direction. Thus, the vehicle is capable to move in any direction by rotating the axis of the drive wheels perpendicular to the desired direction of travel. By applying motive force to the wheels in the appropriate direction and speed, the vehicle can turn and move in any direction perpendicular to the axis of the drive wheels within the area covered by its circumference. Rotating about the vertical axis to any radial position without changing its original footprint, the vehicle requires a true zero turning or maneuvering radius, and thus requires only the space that it occupies in which to maneuver in any direction. The "footprint" is the area on the ground below the vehicle when it is at rest.

One embodiment of the invention is a vehicle capable of pulling single or multiple pieces of equipment such as trailers or various sized objects such as aircraft. In this configuration as a tow vehicle or tractor, the vehicle is equipped with a smooth outer ring including upper and lower rails which support a trolley. The trolley includes a plurality of precision wheels or rollers that are rotatably coupled to the upper and lower rails of the outer ring and enable the trolley to move freely around the entire circumference of the outer rim of the vehicle. The trolley can be rotated either manually, or through the use of a motor, for positioning the trolley to the desired position at any point about the circumference of the vehicle prior to connection to the object to be moved. Attached to the trolley via a hitch is a pivoting arm that can be quickly removed or stored in the vertical position perpendicular to the ground when not in use, or when required, lowered to a position approximately parallel to the ground where it may then be attached to an airplane. The connecting arm is capable of movement about an arc vertically from its pivot point, but not laterally relative to the pivot point.

When the connecting arm is then connected to the object to be moved, and after the axis of the tow vehicle drive wheels is positioned (by operator action) perpendicular to the desired direction of movement, the tow vehicle exerts a pushing or pulling motive force against the object (e.g., airplane) being towed or pushed. The direction of travel of the towed or pushed object can be changed by adjusting the angle of the connecting arm or hitch relative to the direction of travel of the axis of the tow vehicle drive wheels. This is accomplished by rotating the axis of the drive wheels of the tow vehicle radially to any desired angle relative to the object being towed or pulled and then exerting forward or reverse power to the drive wheels. Because the trolley assembly to which the connecting arm is attached is capable of movement freely about the circumference of the tow vehicle, the angle of the connecting arm or hitch can constantly be adjusted to achieve the desired direction of travel of the object being pulled or pushed. This changing of relative angle and direction does not transmit any stress to the object being pushed or pulled, because the speeds of the drive wheels are continuously variable from zero to maximum and the trolley and arm move about the circumference of the tow vehicle with very little, if any, friction.

The arrangement of a substantially outer circular shape of a vehicle with a smooth and unobstructed outer perimeter in combination with two independently variable speed bi-directional drive wheels located on a single axis through the exact center of the vehicle and a hitch that is free to move about the full circumference of the vehicle results in a tow vehicle characterized by the ability to move omni-directionally about a given point, change directions with zero maneuvering room beyond the physical footprint of the vehicle, and push or pull other mobile vehicles with precise control. Such characteristics reduce the operating space on the ground required to move or handle an object being manipulated, thus increasing operating efficiency. Safety is increased because the operator of such a vehicle, positioned directly at the center of the tow vehicle, can always be facing the direction the vehicle is moving, never having to back up or look backwards.

Whether pushing or pulling another object such as an aircraft the field of vision of the operator of the tow vehicle is always facing the direction of movement of the vehicle. In operation, the operator rotates the axis of the drive wheels until it is perpendicular to the direction of the desired travel by rotating one wheel in one direction and the other in the opposite direction. Once the desired drive axle orientation is reached (perpendicular to the desired direction of travel), both wheels are given power equally, causing the vehicle to move in the direction perpendicular to the drive wheel axis of the tow vehicle axle. The vehicle being towed or pushed is then steered in the new direction and the angular attitude between the tow vehicle and the steering axle of the vehicle being towed or pushed automatically comes into an appropriate geometry as the radial hitch travels about the perimeter of the tow vehicle.

The maneuvering characteristic of the omni-directional vehicle equally lends itself to use where precision 2, 3, or 4 axis indexing, i.e., detailed positioning, of the vehicle is required. For example, the omni-directional vehicle is well suited for precisely positioning ordinance to be loaded on an aircraft wing. Thus, in another embodiment of the invention, the vehicle may include a turret assembly, rotatably mounted on the vehicle frame. The turret assembly preferably includes an articulated arm which can be extended to carry a weapon or folded when not in use. The vehicle has a turret motor drive to rotate the turret. The omni-directional vehicle can rotate in place in one direction while the turret is simultaneously rotated in the opposite direction (with respect to the vehicle frame) at the same rate. This action allows the arm and supported weapon to remain motionless over the ground while the vehicle changes heading. The weapon can then be translated over the ground a given distance at the new heading. Alternatively, weapon can be rotated by rotating the turret while the vehicle remain stationary over the ground or moves linearly. In an alternate embodiment, the ODV may not include a turret, but the ordinance handling arm may be rotatively mounted to the ODV body such that it rotates about the vertical axis.

In a preferred embodiment, the vehicle includes both the circumferential trolley hitch assembly 42 with towbar 48 and an articulated ordinance handling arm 60 for maximum versatility.

BRIEF DESCRIPTION OF THE DRAWINGS

The invention is described in detail hereinafter on the basis of the embodiments represented in the accompanying figures, in which:

FIG. 3 is a top view of the ODV of FIG. 2 showing the operator's seat and control levers;

FIG. 4 is a detailed side cross section of the ODV frame and circular trolley rail of the vehicle of FIG. 1 showing the trolley hitch assembly and a typical portion of the turret mount assembly;

DESCRIPTION OF THE PREFERRED EMBODIMENT OF THE INVENTION

Figure 1:
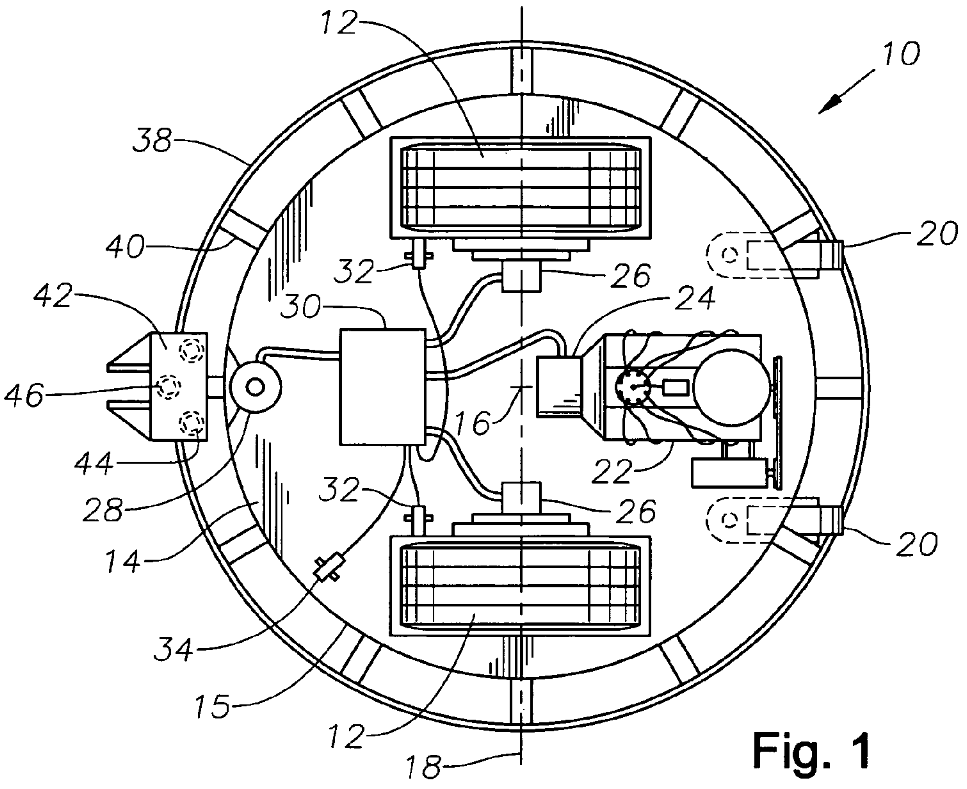
FIG. 1 is a horizontal cross section along lines 1-1 of FIG. 2 looking down into one embodiment of an Omni-Directional Vehicle (ODV) according to the invention showing major drive components, a circular rail about the frame of the ODV, and a trolley hitch assembly rotatably mounted on the rail.
Figure 2:
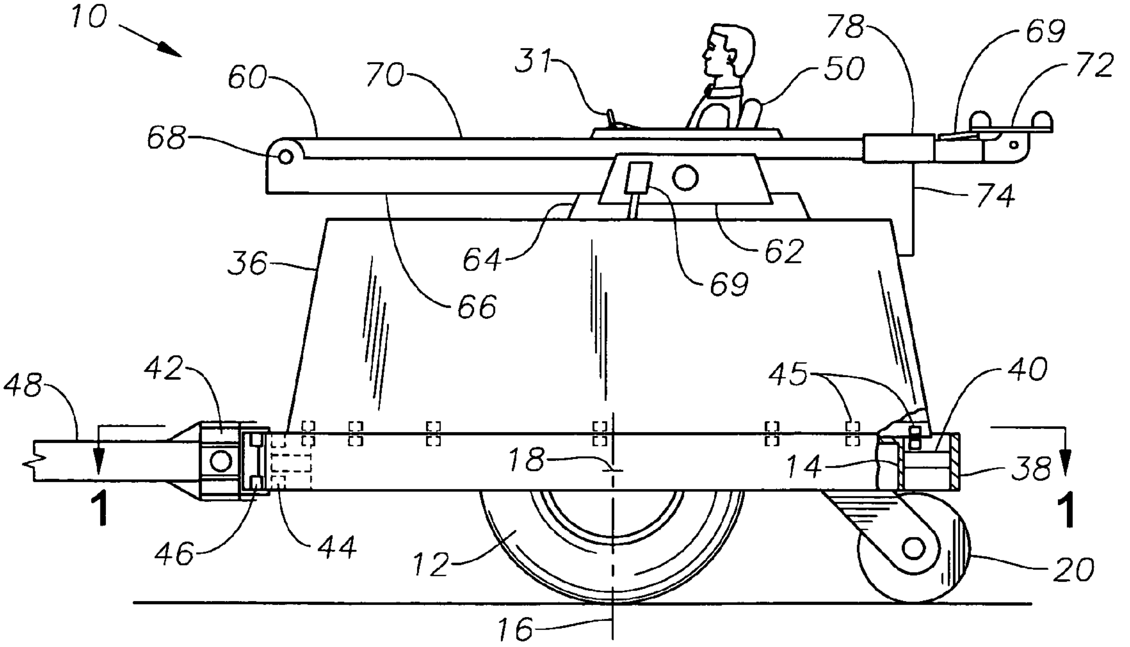
FIG. 2 is a side view of the ODV of FIG. 1 showing a hitch-mounted aircraft towbar, a rotatable turret assembly and an ordinance handling arm folded in a stowed position.

FIG. 1 is a horizontal cross section, taken along lines 1-1 of FIG. 2, of an Omni-Directional Vehicle 10 (hereafter ODV) according to one embodiment of the invention. The ODV 10 includes two drive wheels 12 rotatively mounted on a frame 14 which has an outer perimeter 15 in the shape of a circle. The circular frame 14 has a vertical axis 16 which is perpendicular to the horizontal plane of FIG. 1. The drive wheels 12 are mounted along a horizontal axis 18 which is perpendicular to the vertical axis and intersects the vertical axis as shown in FIG. 1. Two swivel castor wheels 20 are pivotably mounted to the frame 14 at the rear of the ODV 10. However, a different number of swivel caster wheels may be mounted at various points along frame 14.

Referring to FIG. 1, a power source 22 is mounted on the frame 14. The power source 22 is preferably a diesel engine which powers a generator 24 similar to a motive drive assembly of a diesel locomotive for train service, for example. However, other sources 22 may be used, including a gasoline internal combustion engine or turbine engine. The generator 24 provides electric power to two separate electric motor assemblies 26, one for each drive wheel 12, and optionally to a turret motor 28 and/or other actuators 69 (FIG. 2). Drive motors 26 and turret motor 28 are preferably DC stepper motors or servo motors which allow precise positioning, indexing, and instant starting, stopping and reversing. The speed and direction of rotation of electric motors 26 and the drive wheels 12 driven thereby is controlled by a control system 30 which provides drive current sources based on the desired motion.

The control system 30 receives electric power from generator 24 and powers drive motors 26 and turret motor 28 as directed by the control circuitry based on control and feedback inputs. Control inputs preferably include two user-operated hand levers 31 (FIG. 3), one for the operator's left hand and the other for the operator's right hand. Feedback inputs include proximity sensors 32 or similar position and/or speed indicators for each of the two drive wheels 12 and a proximity sensor 34 or similar position and/or speed indicator for the turret assembly 36 (FIG. 2).

During aircraft movement operations, the turret 36 is held stationary with respect to frame 14. The left and right control levers 31 operate exactly the same to control the left and right drive wheels 12, respectively. Each lever and valve has a neutral position, such that when a lever is at such neutral position, a wheel associated with that lever is electrically braked. If a lever is pushed forward away from the operator, the corresponding wheel motor 26 is driven in the forward direction for turning its attached drive wheel 12. Likewise, if a lever 31 is pulled toward the operator, the corresponding motor 26 and drive wheel 12 are driven in reverse. The greater distance that a lever is moved from its neutral position, the faster the associated wheel motor 26 and drive wheel 12 turn.

If both levers 31 are moved in the same direction and amount and at the same time, both drive wheels 12 move at the same speed, thereby causing straight-ahead movement of the ODV 10 over the ground. That movement is perpendicular to the horizontal axis 18. If the levers 31 are pushed forward or backward at an unequal distance from each other, the lever 31 moved the greater distance will produce a greater speed of rotation, causing the vehicle 10 to turn in the direction of the slower drive wheel 12. For example, if the right control lever 31 is pushed farther forward than is the left lever 31, the ODV 10 turns to the left, and vice versa.

If the right lever 31 is moved forward and the left lever 31 is moved backward and both lever positions are the same in amount and opposite in direction, the left wheel 12 turns backward and the right wheel 12 turns forward, both at the same rate of rotation. In this instance, the ODV 10 turns in its own space or footprint while its footprint generally remains stationary over ground, i.e., the ODV rotates about the vertical axis 16. (The footprint over the ground is the area of the ground beneath the vehicle.) The counter-clockwise rotation described above becomes a clockwise rotation when the right wheel 12 rotates backward at the same rate as the forward rotation of the left wheel 12. Thus, the ODV 10 can change its heading while generally not moving or varying its footprint over the ground. If the ODV 10 does not interfere with any object on the ground at one heading, it will not likely interfere with any object at any heading because the ODV footprint generally does not change during rotation.

The two drive wheels 12 are preferably located in the exact center axis 18 of the vehicle 10. Two additional swivel wheels or castors 20 are ideally mounted at the rear of the vehicle 10. The rear castors 20 provide support for balancing the weight of the vehicle, supporting the power source 22 and other ballast weight (as required to counterbalance a loaded ordinance handling arm) to keep the frame 14 substantially level. The swivel castors 20 are mounted on the frame 14 at positions so as not to protrude from the outer circumference of the vehicle when the vehicle is turning about vertical axis 16 in order to prevent contact with other objects while the ODV 10 is spinning. When the ODV 10 moves forward, the castors 20 may trail outside the ODV circumference without any substantial obstruction effect. Although ODV 10 is illustrated as having two swivel casters 20, any number of swivel castors may be employed at varying points along the frame 14, depending on the weight distribution and application of vehicle.

FIG. 1 shows a circular trolley rail or ring 38 is mounted to the frame 14 with a plurality of mounting spacers 40 or by other suitable means. The trolley rail 38 provides a smooth running surface for one or more movable trolley hitch assemblies 42. Trolley hitch assembly 42 has a plurality of rollers 44 located inboard of the rail 38 and rollers 46 located outboard of the rail 38 which rotatably capture rail 38 with substantially no looseness. The trolley hitch assembly 42 is the point of quick-couple attachment for the aircraft towbar assembly 48 (FIG. 2). The trolley hitch assembly 42 is preferably arranged and designed to freely rotate about circular rail 38, although it may be rotated by powered assemblies with electric or hydraulic motors, for example.

FIGS. 2 and 3 are side and top views, respectively, of the ODV 10 according to a preferred embodiment. An aircraft towbar assembly 48 is shown attached to the trolley hitch assembly 42. The towbar 48 and trolley hitch assembly 42 are preferably designed for quick coupling and uncoupling. A turret assembly 36 is shown rotatably mounted to the ODV frame 14. The turret 36 rotates about the vertical axis 16. The rotation of turret 36 relative to frame 14 is preferably controlled by turret motor 28 (see FIG. 1) which has a rotor which engages a race or circular rack (not shown) mounted to an inside of turret 36, although other mechanisms may be used. The turret motor 28 is in turn controlled by control system 30 (see FIG. 1). The turret 36 is shown generally having a conic frustum shape, although other shaped turrets may be used. FIGS. 2 and 3 also show rollers 45 which rotatably engage a race portion 47 (see FIGS. 4-5) of ODV frame 14 along outer perimeter 15. The rollers 45 are intervaled along the perimeter of turret 36 and provide a bearing mechanism between the turret 36 and ODV frame 14. The number and size of the rollers are dependent on the expected turret loads. However, other suitable bearing arrangements may be used. A seat 50 for the operator is mounted on top of the turret 36, preferably in a location which coincides with or is near to vertical axis 16.

FIG. 4 is a side view cross section of the trolley rail 38 and its attachment to the vehicle frame 14 with spacers 40 placed around the frame perimeter 15. Trolley hitch assembly 42 has a plurality of rollers 44 positioned inboard of the trolley rail 38 and a plurality of rollers 46 positioned outboard of the rail 38. Both the inboard and outboard side of rail 38 has rollers positioned at both the top and bottom of the rail 38, usually in sets. In other words, the rollers are preferably positioned with a number of upper and lower roller pairs 44 set inboard of the rail 38 and generally an equal number of upper and lower roller pairs 46 set outboard of the rail 38. The rollers 44, 46 rotatably capture rail 38 with substantially no vertical or horizontal looseness. The mounting positions of the rollers 44, 46 match the curvature of the rail 38, thus allowing the trolley hitch assembly 42 to rotate smoothly with minimal friction and resistance about rail 38. The number and size of rollers 44, 46 may vary depending on the expected maximum loads. The rollers 44, 46 bear loads in both the horizontal and vertical directions and thus may be equipped with bearings to provide smooth rotation of the trolley hitch assembly 42 with respect to the ODV frame 14 while under load. The smooth trolley hitch movement reduces stress on the vehicles being moved, such as aircraft that typically have delicate landing gear.

Figure 5:
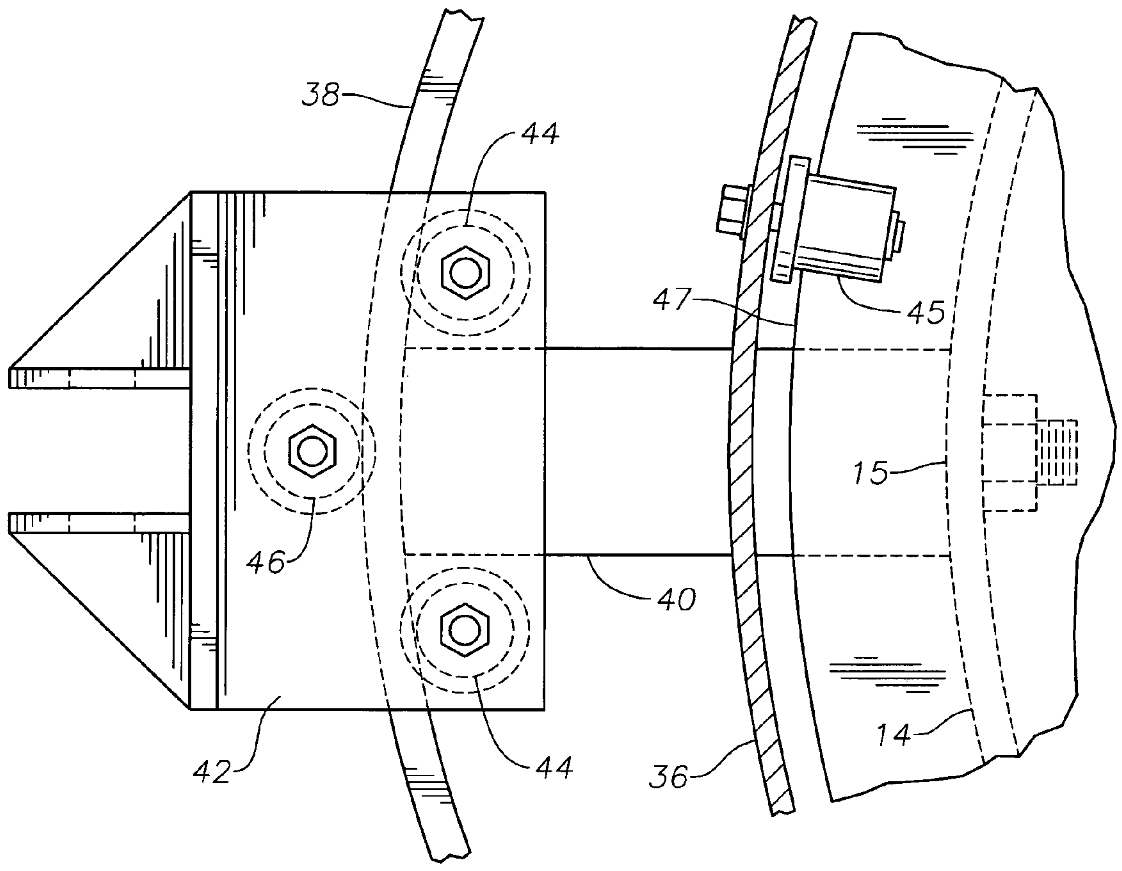
FIG. 5 is a detailed top cross section of the ODV frame and circular trolley rail of the vehicle of FIG. 1 showing the trolley hitch assembly and a typical portion of the turret mount assembly.

FIG. 5 illustrates the trolley hitch assembly 42 from a top view. The two roller pairs 44 located inboard of the rail 38 and one roller pair 46 located outboard of the rail trap the rail with substantially no looseness. FIGS. 4 and 5 also show turret rollers 45 which rotatably engage a race portion 47 of ODV frame 14 along outer perimeter 15. The rollers 45 are preferably intervaled along the perimeter of turret 36 and provide a bearing mechanism between the turret 36 and ODV frame 14 for smooth rotation under load. The number and size of the rollers are dependent on the expected turret loads. Alternatively, plain bearings, cams, or other suitable devices may be used in place of rollers 44, 45, 46.

Figure 6:
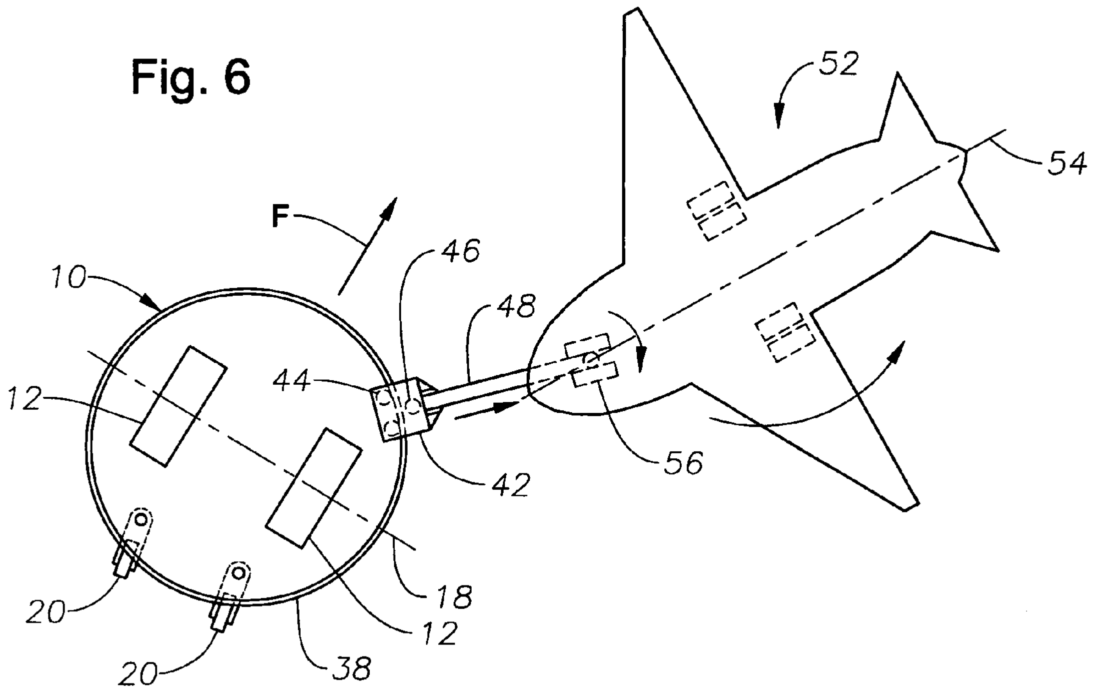
FIGS. 6 and 7 are plan view illustrations of the ODV pushing an airplane such that airplane is caused to turn while being pushed.
Figure 7:
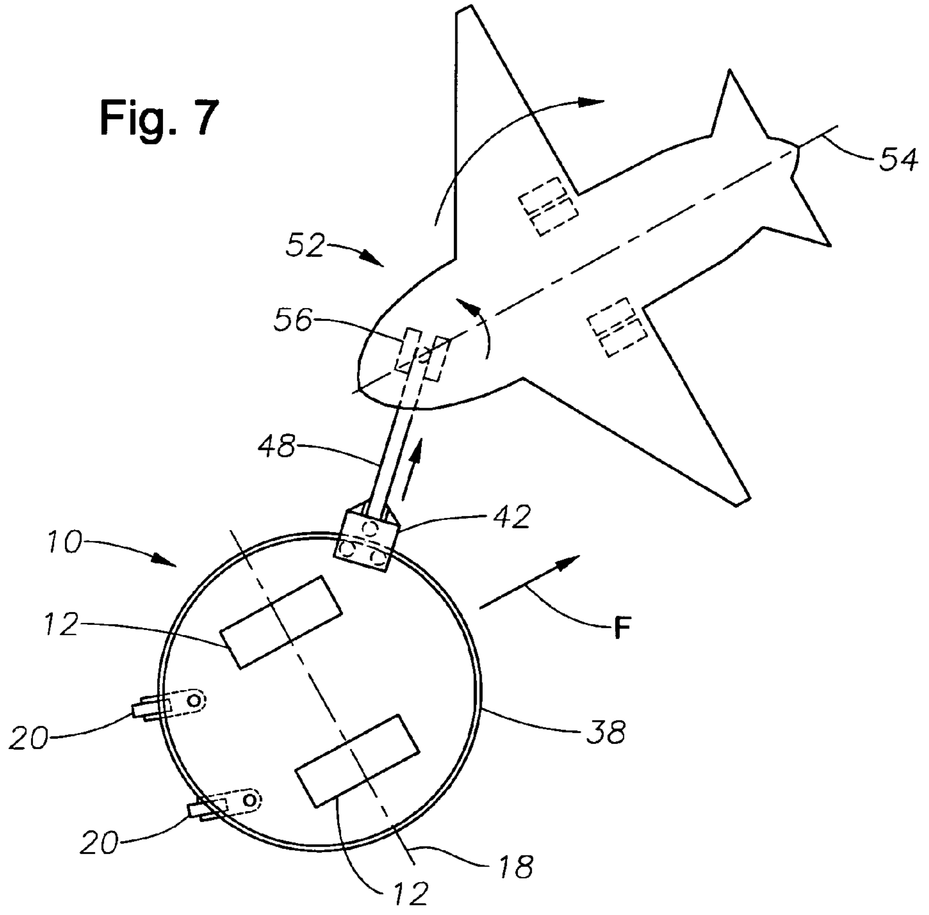

Referring to FIGS. 6-7, the trolley hitch assembly 42 is preferably able to freely rotate about trolley ring 38 during aircraft movement operations. The operator of the ODV 10 in this configuration positions the vehicle relative to the aircraft towbar assembly 48 (and aircraft 52) attached to trolley hitch assembly 42 by keeping the ODV 10 behind the towbar 48. The motion is similar to backing up a vehicle with a towed trailer, except the operator is facing in the direction of motion. In other words, the towbar assembly 48/aircraft 52 is coupled to the trolley hitch assembly 42 at the front of ODV 10, and the operator is able to steer the aircraft 52 by slightly turning the vehicle to the right or the left. If the trolley hitch assembly 42 is allowed to get too far from the front center of the ODV 10, its tendency is to pass down the side of the vehicle to the rear causing a jack-knife situation. In this case, the operator must "turn into the trolley" to regain a position firmly behind the trolley hitch assembly 42. An operator is able to quickly maneuver the towbar 48 in the same manner that a window washer expertly wields a squeegee.

FIGS. 6 and 7 illustrate the ODV 10 pushing an airplane 52 by rotating the drive wheels 12 of the ODV such that the forward direction of the ODV 10 is depicted by the arrow F. The forward direction F is perpendicular to the horizontal axis 18 running through the drive wheels 12. In FIG. 6, the arrow F is directed to the airplane's right side of centerline 54; with both wheels moving forward, the trolley hitch assembly 42 tends to move to the right side of ODV 10 and the nosewheel 56 of the airplane 52 is turned to the right, causing the airplane 52 to turn toward the right, i.e., to move in a counter clockwise arc when viewed from above, as it is pushed rearward. FIG. 7 shows the opposite maneuver. ODV 10 forward motion F is directed to the aircraft's left side of centerline 54, causing the opposite movement of the nosewheel 56 and a clockwise rotation of the airplane as it is pushed rearward. In this manner, the ODV 10 is capable of controlling the direction of movement of the airplane 52 in a smooth, uninterrupted manner. Because the drive wheels 12 of the ODV are continuously variable, it is possible to move at only creeping speeds up through maximum travel speeds without changes in gears or interrupting the movement of the airplane 52.

Referring back to FIGS. 2 and 3, the ODV according to one embodiment has an ordinance handling mechanism 60 attached to the top of turret assembly 36. Preferably, the ordinance handling mechanism 60 is articulated so that it may be folded to minimize the ODV footprint when its use is not required. For example, the ordinance handling mechanism 60 may consist of two trunnion assemblies 62, each pivotably carried by a stand 64 mounted to the turret 36. The stands 64 and/or trunnion assemblies 62 are outfitted with actuators 69 to control pivoting of the trunnion assemblies 62. The actuators 69 are preferably electric and capable of incremental and precise positioning, but other actuators, for example, hydraulic actuators may be used. As actuators are well known in the art, they are not discussed further herein. Attached to the forward end of each trunnion assembly 62 is a lower arm 66 which terminates in a hinge 68. The two hinges 68 are pivotably attached to a U-shaped upper arm assembly 70. The distal end of the upper arm assembly 70 terminates in a holding tool or cradle 72 which is designed and arranged to accommodate a particular weapon. The cradle 72 may also have its position controlled by an actuator 69, preferably am electric actuator. A U-shaped counterweight assembly 74 is attached to the rear ends of the trunnion assemblies 62 to balance the weight of a weapon held in cradle 72. A recess 76 in the conic frustum-shaped turret 36 may be provided to accommodate the counterweight assembly 74 if necessary. The ordinance handling mechanism is preferably disposed such that the operator's seat 50 is located within the U-shaped upper arm assembly 70 when the upper arm assembly is folded in the stowed position as shown. The upper arm assembly 70 may optionally have a length adjustment mechanism 78.

Figure 8:
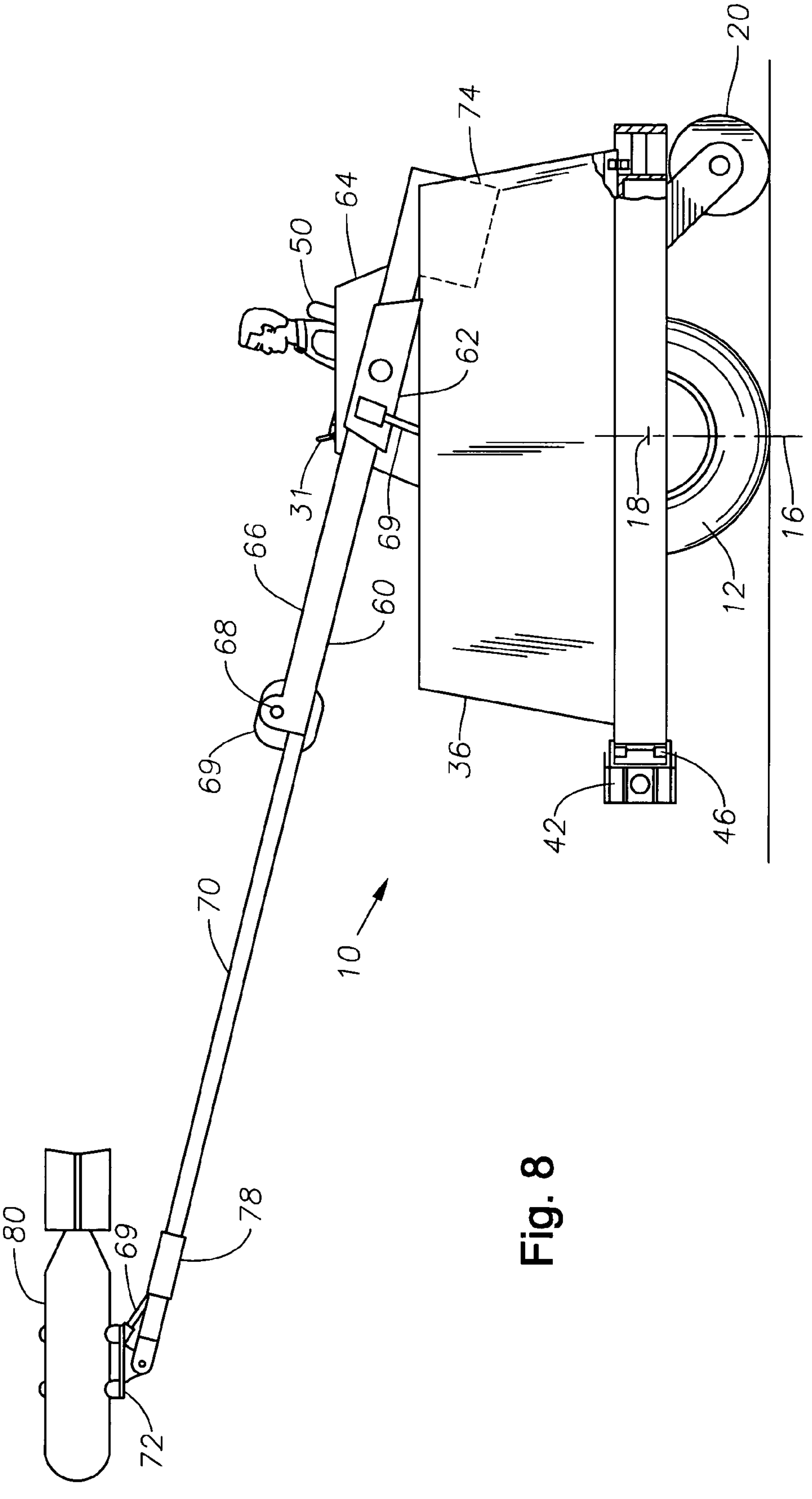
FIG. 8 is a side view of the ODV of FIG. 2 showing the ordinance handling arm extended for use and carrying ordinance.
Figure 9:
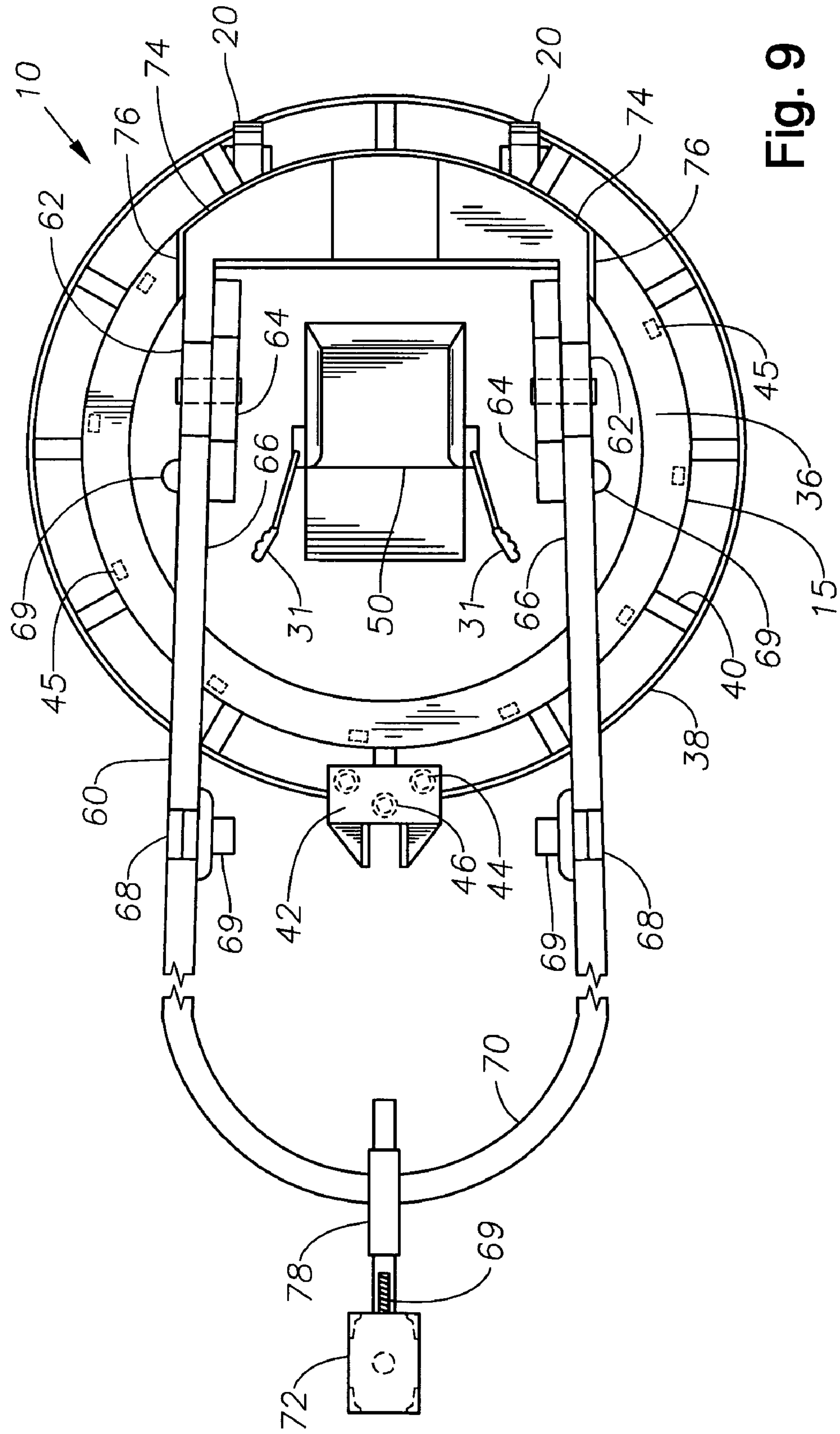
FIG. 9 is a top view of the ODV of FIG. 8 showing the operator's seat and control levers.

FIGS. 8 and 9 are side and top views, respectively, of the ODV 10 illustrated in FIGS. 2-3 showing the ordinance loading mechanism 60 in an unfolded operating position. Each hinge 68 is designed so that mating ends of lower arm 66 and upper arm 70 abut when the arms are linearly aligned so that upper arm 70 is supported when extended. The towbar assembly 48 is preferably removed from trolley hitch assembly 42 for munitions handling operations.

Referring to FIGS. 2, 3, 8, and 9, although a U-shaped upper arm assembly 70 is described and illustrated, other configurations such as Y-shaped, yoke, wishbone, or other suitably shaped arms may be used. Furthermore, ordinance handling mechanisms 60 which do not pivot as such, for example, a scissors jack assembly, piston jack, etc., may be used as appropriate. In an alternate embodiment (not illustrated), the ODV does not contain a movable turret. Rather, an ordinance handling mechanism which itself rotates about vertical axis 16 is mounted to a fixed ODV body, cab, or frame.

Figure 10:
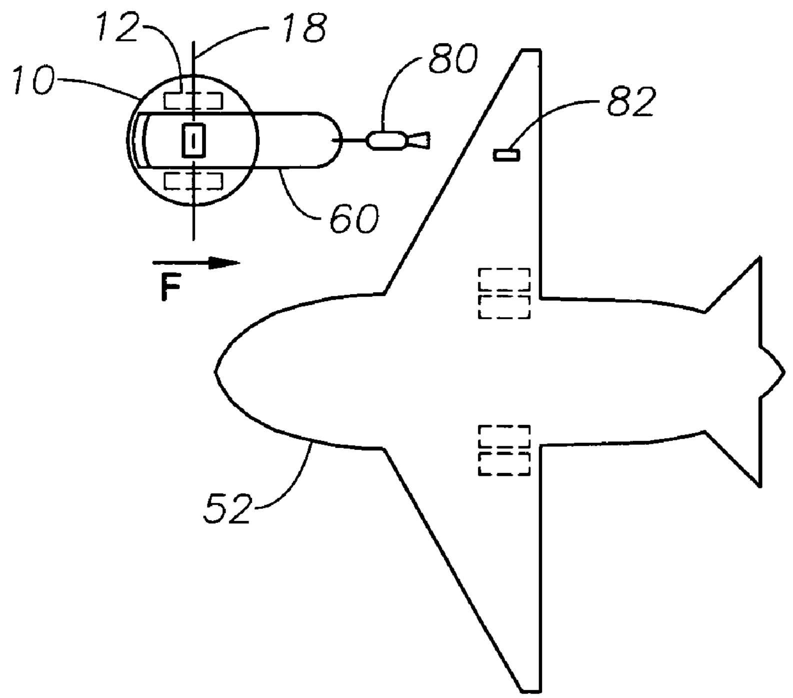
FIGS. 10, 11 and 12 are plan view illustrations of the ODV of FIG. 9 attaching a weapon to the underside of an airplane wing, showing the ability of the ODV to change headings while keeping the weapon stationary over ground and to translate in any heading.
Figure 11:
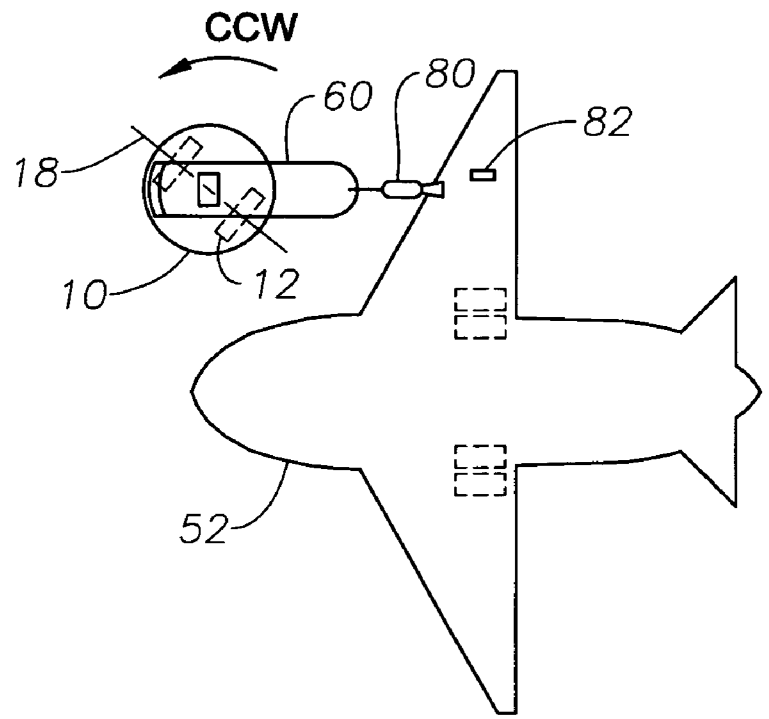
Figure 12:
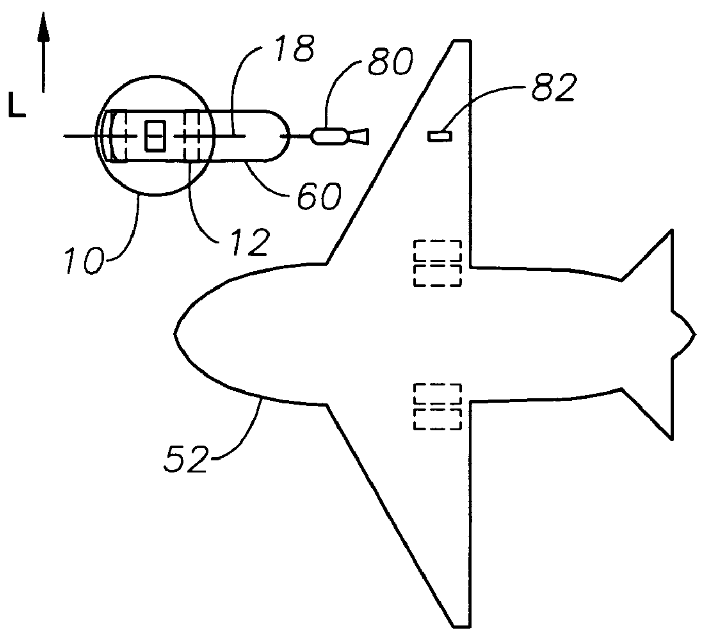

Referring to FIGS. 10-12, a sequence for loading a bomb on to the underside of a wing of aircraft 52 using ODV 10 is illustrated. In FIG. 10, a bomb 80 is carried by ordinance loading mechanism 60. The ODV 10 is moved forward in the direction labeled F by moving both drive wheels 12 forward at the same rate of rotation to position bomb 80 under receptacle 82. In FIG. 11, bomb 80 is laterally misaligned from receptacle 82. The ODV 10 rotates counterclockwise by driving the right wheel 12 forward and left wheel backward at the same rates of rotation. Simultaneously, turret 36 is rotated clockwise with respect to the ODV frame 14 by turret motor 28 (see FIG. 1) at the same rate of rotation as the ODV over ground. Thus, weapons handling mechanism 60 remains stationary over the ground. Control system 30 uses feedback sensors 32 on drive wheels 12 and feedback sensors 34 on the turret to control the drive wheel motors 26 and turret motor 28 so that turret 36 remains motionless during the operation (see FIG. 1). In FIG. 12, ODV 10 is facing perpendicular to ordinance handling mechanism 60. Both drive wheels 12 are now moved slowly forward at the same speed to move bomb 80 laterally in direction L with respect to aircraft 52. Next, bomb 80 is laterally aligned with receptacle 82. The process described with respect to FIG. 11 is now reversed so that ODV 10 rotates clockwise while turret 36 rotates counterclockwise at the same rate. In other words, ODV rotates clockwise "under" turret 36, which is held stationary over ground. ODV 10 is rotated until it is aligned in the forward direction with ordinance loading mechanism 60 as shown in FIG. 10. The ODV is now driven forward until bomb 80 is perfectly aligned with receptacle 82 for attachment thereto.

The control system 30 (FIG. 1) is preferably computer controlled and includes appropriate position, speed and/or acceleration sensors for feedback. The control system may include additional inputs, such as strain gauges or optical sensors mounted on the ordinance loading mechanism 60 for determining distance and relative bearing of the bomb 80 to the receptacle 82. Unequal wheel speeds and turret rotation allow for sophisticated and variable positioning of bomb 80. An infinite number of complex combinations of motions may be accurately repeated. In the preferred embodiment, drive wheel motors 26, turret motor 28 and ordinance handling mechanism 60 actuators 69 are all electric devices capable of precise positioning and centrally controlled by control system 30. Control system 30 is preferably designed and arranged to be programmed, much like numerically controlled (CNC) machines, to perform repetitive tasks requiring precise motion control of numerous degrees of freedom. An operator could set the control system 30 to a learning mode, which would record the motions of the vehicle during a particular task. Then, an operator could later execute the recorded sequence of motions to exactly repeat the task. For example, programs corresponding to loading and unloading sequences for particular missiles, bombs, or other devices at particular receptacles of particular aircraft can be created, stored and executed to partially automate and speed the ordinance handling processes, while significantly reducing chances of error or mishap. As motion control systems are well known in the prior art, they are not discussed further herein.

Figure 13:
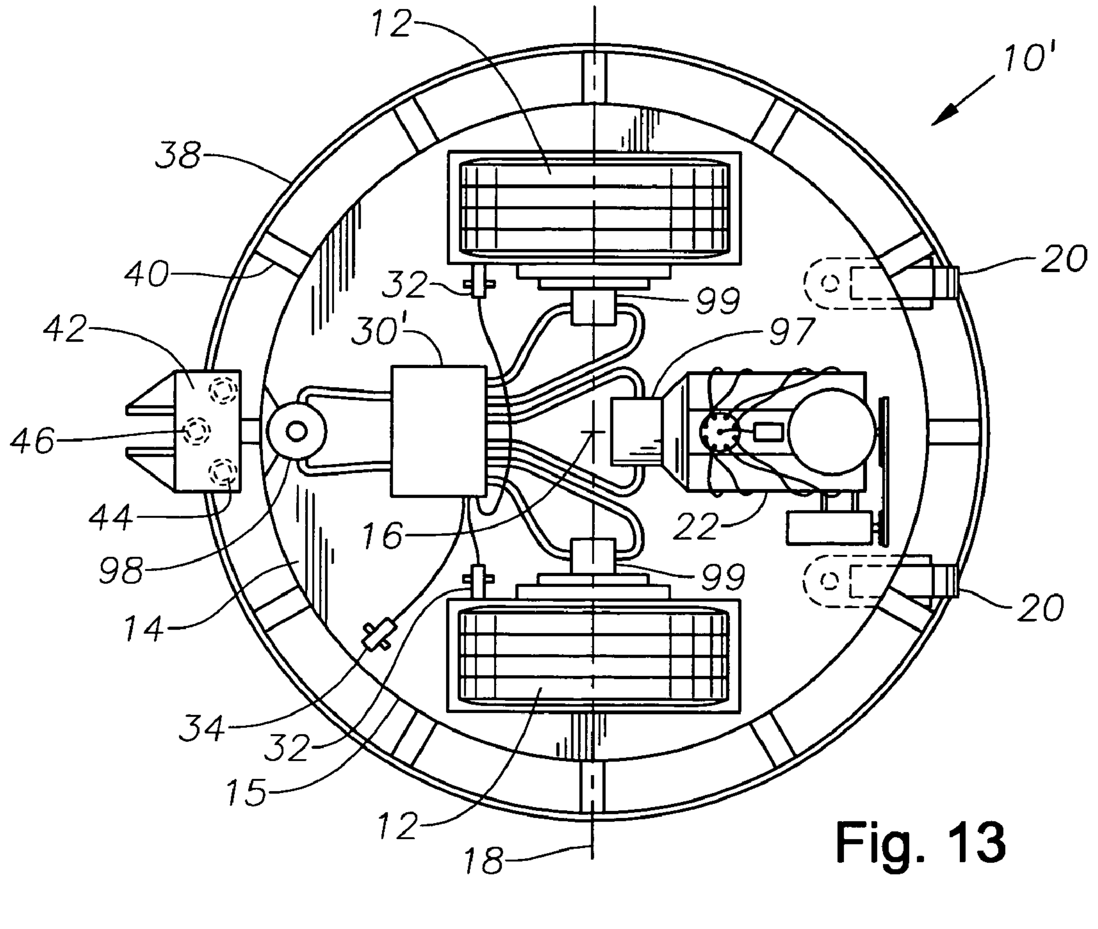
FIG. 13 is an alternate embodiment of the ODV of FIG. 1, showing hydraulic drive and motion components in place of electric drive and motion components.

FIG. 13 illustrates an alternate embodiment of the vehicle 10' according to the invention. The ODV 10' of FIG. 13 is identical to the ODV 10 of FIG. 1, except that the power source 22 drives a hydraulic pump 97 instead of an electric generator 24. Electric drive motors 26 are replaced by hydraulic motors 99, and electric turret motor 28 is replaced by hydraulic motor 98. Preferably, electric ordinance handling mechanism 60 actuators 69 (FIG. 2) are replaced by hydraulic actuators (not shown). The hydraulic pump 97 provides balanced pressurized hydraulic fluid to the two separate hydraulic motor assemblies 99, one for each drive wheel 12, and optionally to the turret motor 98 and/or other actuators. The speed and direction of rotation of hydraulic motors 99 and the drive wheels 12 driven thereby is controlled by a control system 30' which ports hydraulic fluid to the hydraulic components. The control system 30' receives powered hydraulic fluid from pump 97 and ports the fluid to hydraulic drive motors 99 and turret motor 98 as directed by the control circuitry based on control and feedback inputs.

Although ODV 10 is described herein as adapted for handling aircraft and ordinance, the vehicle may be suitable for use anywhere where precise 2, 3, 4, or more axis positioning is required. The invention thus includes as embodiments vehicles which may substitute for smaller cranes, boom trucks, cherry pickers, etc.

The Abstract of the disclosure is written solely for providing the United States Patent and Trademark Office and the public at large with a means by which to determine quickly from a cursory inspection the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A powered vehicle (10) comprising, a circular frame (14), first and second drive wheels (12) rotatively coupled to said frame, each of said drive wheels capable of independent powered forward and rearward rotation about a horizontal axis (18), said first and second drive wheels being revolvable about a vertical axis (16) which intersects said horizontal axis midway between said first and second drive wheels, said vertical axis disposed generally centered within said circular frame, a handling mechanism (60) rotatively coupled to said frame for rotation about said vertical axis with respect to said frame, and a turret (36) rotatable coupled to said frame for rotation about said vertical axis, said handling mechanism non-rotatively mounted to said turret, whereby said first and second drive wheels may be rotated in opposite directions at the same speed causing said frame to rotate about said vertical axis.

2. The vehicle of claim 1 further comprising, a circular rail (38) disposed about an outer perimeter of said frame, and a trolley hitch assembly (42) slideably mounted on said rail, said trolley hitch assembly being connectable to a towbar (48).

3. The vehicle of claim 1 further comprising, an operator seat (50) mounted on said turret at a position generally intersected by said vertical axis and between said first and second drive wheels, a first control lever (31) positioned on a first side of said operator seat, said first control lever operatively coupled to a first power source (26) for controlling the speed and direction of rotation of a first drive wheel, and a second control lever (31) positioned on a second side of said operator seat, said second control lever operatively coupled to a second power source (26) for controlling the speed and direction of rotation of a second drive wheel.

4. The vehicle of claim 1 further comprising, a castor (20) mounted on said frame for supporting said frame on a ground surface.

5. The vehicle of claim 1 further comprising, a motor (28) coupled to said frame and to said handling mechanism, said motor being capable of rotating said handling mechanism with respect to said frame.

6. The vehicle of claim 5 further comprising, a control mechanism (30) operatively coupled to said motor and capable of controlling the direction and speed of rotation of said handling mechanism in relation to the direction and speed of said first and second drive wheels.

7. The vehicle of claim 1 wherein, said handling mechanism (60) includes an arm pivotably coupled to said frame about a horizontally disposed trunnion.

8. The vehicle of claim 7 wherein, said arm is articulated, defining an upper arm segment (70) and a lower arm segment (66), whereby said arm has a folded, stowed position and an unfolded, operable position.

9. The vehicle of claim 7 wherein, said handling mechanism (60) includes a counterweight (74).

10. The vehicle of claim 1 wherein, said handling mechanism (60) includes a cradle (72) dimensioned for carrying ordinance.

11. A powered vehicle (10) comprising, a circular frame (14), first and second drive wheels (12) rotatively coupled to said frame, each of said drive wheels capable of independent powered forward and rearward rotation about a horizontal axis (18), said first and second drive wheels being revolvable about a vertical axis (16) which intersects said horizontal axis midway between said first and second drive wheels, said vertical axis disposed generally centered within said circular frame, whereby said first and second drive wheels may be rotated in opposite directions at the same speed causing said frame to rotate about said vertical axis, and a handling mechanism (60) rotatively coupled to said frame for rotation about said vertical axis with respect to said frame, said handling mechanism (60) including an articulated arm pivotably coupled to said frame about a horizontally disposed trunnion, said articulated arm defining an upper arm segment (70) and a lower arm segment (66), whereby said articulated arm has a folded, stowed position and an unfolded, operable position.

12. The vehicle of claim 11 further comprising, a circular rail (38) disposed about an outer perimeter of said frame, and a trolley hitch assembly (42) slideably mounted on said rail, said trolley hitch assembly being connectable to a towbar (48).

13. The vehicle of claim 11 further comprising, an operator seat (50) coupled to said frame at a position generally intersected by said vertical axis and between said first and second drive wheels, a first control lever (31) positioned on a first side of said operator seat, said first control lever operatively coupled to a first power source (26) for controlling the speed and direction of rotation of a first drive wheel, and a second control lever (31) positioned on a second side of said operator seat, said second control lever operatively coupled to a second power source (26) for controlling the speed and direction of rotation of a second drive wheel.

14. The vehicle of claim 11 further comprising, a castor (20) mounted on said frame for supporting said frame on a ground surface.

15. The vehicle of claim 11 further comprising, a motor (28) coupled to said frame and to said handling mechanism, said motor being capable of rotating said handling mechanism with respect to said frame.

16. The vehicle of claim 11 further comprising, a control mechanism (30) operatively coupled to said motor and capable of controlling the direction and speed of rotation of said handling mechanism in relation to the direction and speed of said first and second drive wheels.

17. The vehicle of claim 11 further comprising, a turret (36) rotatably coupled to said frame for rotation about said vertical axis, said handling mechanism non-rotatively mounted to said turret.

18. The vehicle of claim 11 wherein, said handling mechanism (60) includes a counterweight (74).

19. The vehicle of claim 11 wherein, said handling mechanism (60) includes a cradle (72) dimensioned for carrying ordinance.

* * * * *